US010810633B2

(12) United States Patent
Yadav et al.

(10) Patent No.: US 10,810,633 B2
(45) Date of Patent: *Oct. 20, 2020

(54) GENERATING A SHOPPABLE VIDEO

(71) Applicant: Adobe, Inc., San Jose, CA (US)

(72) Inventors: Vikas Yadav, Noida Uttar Pradesh (IN); Balaji Krishnamurthy, Noida (IN); Mausoom Sarkar, New Delhi (IN); Rajiv Mangla, New Delhi (IN); Gitesh Malik, Noida Uttar Pradesh (IN)

(73) Assignee: Adobe, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,720

(22) Filed: Jun. 3, 2019

(65) Prior Publication Data

US 2019/0287139 A1 Sep. 19, 2019

Related U.S. Application Data

(63) Continuation of application No. 14/741,111, filed on Jun. 16, 2015, now Pat. No. 10,354,290.

(51) Int. Cl.
| | |
|---|---|
| *H04N 7/10* | (2006.01) |
| *G06Q 30/02* | (2012.01) |
| *H04N 5/76* | (2006.01) |
| *G11B 27/034* | (2006.01) |
| *G06K 9/00* | (2006.01) |
| *H04N 5/93* | (2006.01) |
| *G06T 7/11* | (2017.01) |
| *G06K 9/62* | (2006.01) |
| *G11B 27/28* | (2006.01) |
| *G11B 27/34* | (2006.01) |
| *H04N 21/254* | (2011.01) |
| *H04N 21/442* | (2011.01) |

(52) U.S. Cl.
CPC ..... *G06Q 30/0276* (2013.01); *G06K 9/00744* (2013.01); *G06K 9/00751* (2013.01); *G06K 9/6211* (2013.01); *G06T 7/11* (2017.01); *G11B 27/034* (2013.01); *G11B 27/28* (2013.01); *G11B 27/34* (2013.01); *H04N 5/7605* (2013.01); *H04N 5/93* (2013.01); *G06T 2207/10016* (2013.01); *G06T 2207/20021* (2013.01); *H04N 21/254* (2013.01); *H04N 21/44222* (2013.01)

(58) Field of Classification Search
CPC .............. H04N 21/44222; H04N 21/254
USPC ..................................... 725/36, 43
See application file for complete search history.

(56) References Cited

U.S. PATENT DOCUMENTS

| | | | |
|---|---|---|---|
| 9,424,461 B1* | 8/2016 | Yuan ............... | G06K 9/00201 |
| 2013/0216094 A1* | 8/2013 | DeLean ............ | G06K 9/00335 |
| | | | 382/103 |

(Continued)

*Primary Examiner* — Pankaj Kumar
*Assistant Examiner* — Sahar Aqil Raiz
(74) *Attorney, Agent, or Firm* — Shook, Hardy & Bacon LLP

(57) ABSTRACT

Embodiments of the present invention provide systems and methods for automatically generating a shoppable video. A video is parsed into one or more scenes. Products and their corresponding product information are automatically associated with the one or more scenes. The shoppable video is then generated using the associated products and corresponding product information such that the products are visible in the shoppable video based on a scene in which the products are found.

20 Claims, 14 Drawing Sheets

(56) References Cited

U.S. PATENT DOCUMENTS

| | | | |
|---|---|---|---|
| 2014/0100993 A1* | 4/2014 | Farmer | G06Q 30/0251 |
| | | | 705/27.1 |
| 2015/0170245 A1* | 6/2015 | Scoglio | G06Q 30/0623 |
| | | | 705/14.55 |
| 2015/0319442 A1* | 11/2015 | Puri | H04N 19/124 |
| | | | 375/240.15 |

* cited by examiner

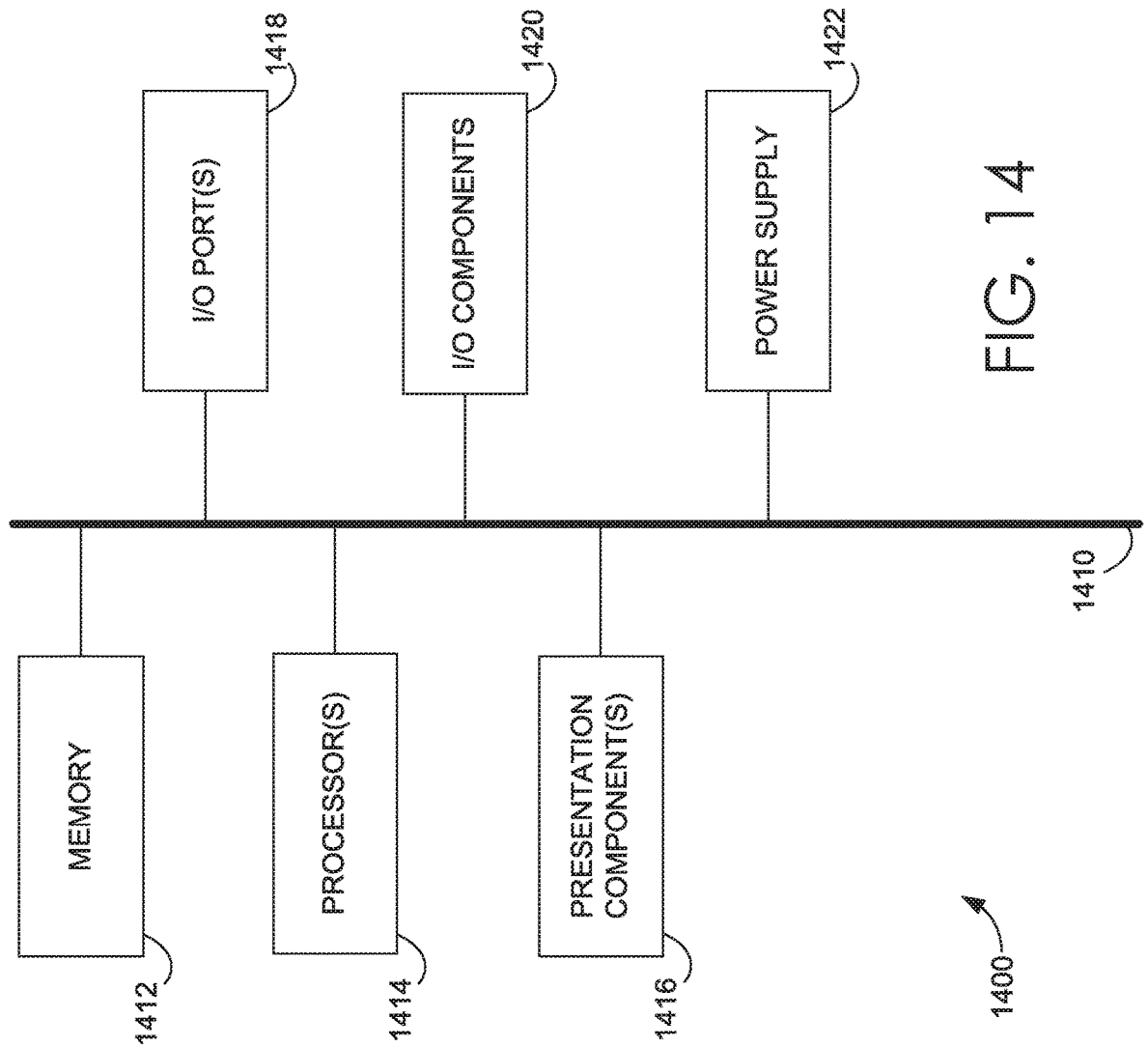

GENERATING A SHOPPABLE VIDEO

CROSS-REFERENCE TO RELATED APPLICATIONS

This application is a Continuation of U.S. patent application Ser. No. 14/741,111, filed Jun. 16, 2015 and entitled "Generating A Shoppable Video," the entire contents of which are incorporated herein by reference.

BACKGROUND

Shoppable videos are newly emerging as a trend in the online commerce space. It is rapidly becoming a reality because of recent technology advancements, including high speed Internet, better devices, and video streaming related innovations, which has led to a rapid growth in video consumption. A shoppable video enables high fashion brands and retailers to tell much richer, and more credible brand stories, which engages new consumers interested in their products.

Today, techniques for creating shoppable videos are primitive. Shoppable videos are typically created without intelligence or automation. For example, the process of manually creating shoppable videos is time consuming and tedious for the author of the shoppable video. In part because of the vast quantity of products on the market that would need to be compared to product images in a video, the manual process of creating shoppable videos is almost impractical, and in addition may lead to inaccuracies in the shoppable video because of human error.

SUMMARY

Embodiments of the present invention generally relate to the automatic generation of shoppable videos by associating products and their corresponding product information with a scene of a video. A video may be divided into scenes, which may be further broken down into video frames. Even further, in one embodiment, each frame is subdivided into tiles. By using a comparison of computed feature vectors for the tiles of each frame to feature vectors computed for a plurality of product images in a database, it can automatically be determined which product(s) is visible in each of the scenes. In one embodiment, the feature vectors of the product images are pre-computed so that when a shoppable video is in the process of being generated, the feature vectors can quickly be compared to one another. This comparison enables a computation of a product score for products having product images in the database. A product with a higher product score may have a higher likelihood of being visible in the frame of the video than a product with a lower product score. Once products determined to be in a video have been identified, a shoppable video is generated. This shoppable video may also include product information associated with the identified products, such as price, where the product is sold, materials of the product, size options, product name, color options, availability, etc.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 14 is a block diagram of an exemplary computing environment suitable for use in implementing embodiments of the present invention.

DETAILED DESCRIPTION

Figure 1:
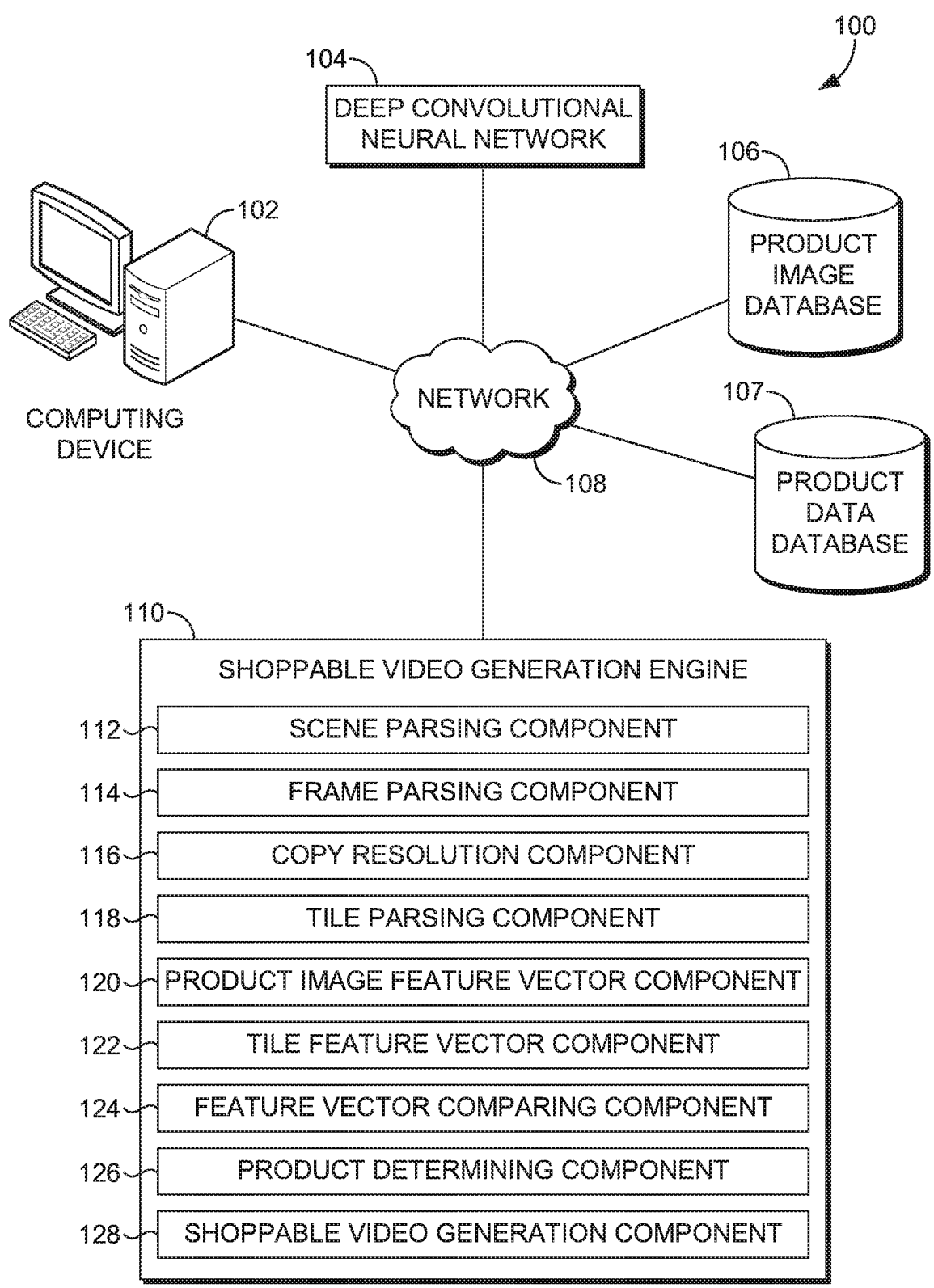
FIG. 1 is a block diagram showing a system for generating a shoppable video, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Shoppable videos are a newly emerging technology trend in the online commerce space. As used herein, a shoppable video is a video, typically viewed on a computing device, such as over the Internet, that allows a consumer to shop for products while watching the video. For instance, while a consumer is watching a shoppable video, the consumer may be presented with product images and product information that appear in the portion of the shoppable video currently being viewed. It has been found that the majority of consumers find videos helpful when purchasing products online. Many consumers also consider brands that use shoppable videos to be more trustworthy than brands that do not use shoppable videos. Further, shoppable videos are highly effective for selling products online. However, there are numerous downsides to the current state of the art in generating shoppable videos, which are oftentimes created manually. For example, the manual process of creating a shoppable video is tedious and time-consuming for the author of the shoppable video. Also, because of the level of human involvement needed to create a manual shoppable video, errors in identifying the products in the videos are commonplace.

Embodiments of the present invention are directed to generating shoppable videos based on a comparison of computed feature vectors. A video is broken down into frames. Frames, as used herein, are electronically coded still images in video technology. In some embodiments, each frame is duplicated to produce one or more copy frames, where the frame and each copy frame have a different resolution from one another. A plurality of frames may be grouped together to form a scene. A scene as used herein may include one set of products that could be presented to the consumer for purchase. For instance, in one exemplary embodiment, a video may be broken down into two scenes, where the first scene presents men's jackets, and the second scene presents women's jackets. Because a consumer is likely interested in one or the other of men's or women's jackets, it makes the consumer's shopping experience more efficient and enjoyable.

Each frame (and copy frame, where utilized) is then divided into tiles, which in one embodiment, overlap with at least one other tile. A tile, as used herein, is a small portion of a frame, where each frame comprises two or more tiles, typically of equal size. Each tile is processed using a neural network, such as a deep convolutional neural network, to identify any products that are visible in each tile. The deep convolutional neural network is one that has been pre-trained on a large class of images. This network is used to obtain a feature vector representing the content of each frame through, in one embodiment, the response of the fully connected layer two levels below the final Softmax classification layer. In one embodiment, a Softmax function is applied to the network for classification, and such determines whether the output of the network indicates that a particular tile being evaluated has certain features. As used herein, a feature vector is an n-dimensional vector of numerical features that represent an object, such as an object in a video frame.

The processing of tiles described herein facilitates the computation of a feature vector for each tile. Various features of objects in each tile, including color components, length, area, shape description, gradient magnitude, or gradient direction, are numerically represented by the computed feature vector. Product images of pre-selected products are stored in a database. Each product image may also have an associated feature vector. This enables the feature vectors associated with tiles to be compared to the feature vectors of product images. When a difference in distance between a feature vector of a tile and a feature vector of a product image is small, this is used as an indicator that the product corresponding to the product image is the product in the tile. This feature vector comparison process may be performed for each tile in each frame (including copy frames having different resolutions) of the entire video.

The comparison of feature vectors described above is used to determine a product score for various products having corresponding product images stored in the database. As used herein, a product score is based on the comparison between feature vector values, and provides an indication as to the likelihood that a particular product is visible in a particular frame. Each product may have one or more corresponding product image, such as images taken of the product from various angles, directions, lighting, and at different resolutions. Once products are identified through a robust voting scheme, which is described in more detail herein, product information is retrieved and associated with a particular scene of a video. In one instance, a product scene may essentially show one set of products during its duration. For example, a video may comprise one or more product scenes, and typically comprises multiple product scenes, such as two or more scenes. The number of scenes identified in a video can greatly differ based on the length of the video, the type of products showcased, etc. This allows a consumer to view a shoppable video and easily find products and product information as they appear in the video. As such, embodiments automatically associate product and product information with their respective product scenes.

Embodiments described herein use deep learning-based techniques to automate the entire shoppable video creation process, which provides a huge value to online commerce companies. This process removes the tedious and inefficient nature of manual video creation, which is typically associated with errors because of the amount of human involvement necessary to manually create a shoppable video. The efficiencies gained in automatically generating shoppable videos is also highly beneficial to the companies who sell the products, in that the time that the shoppable video can be brought to the market is reduced significantly.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 in FIG. 1 includes a computing device 102, a deep convolutional neural network 104, a product image database 106, a product information database 107, and a shoppable video generation engine 110. Network 108 may be wired, wireless, or both. In embodiments, the shoppable video generation engine 110, the computing device 102, the deep convolutional neural network 104, the product image database 106, and the product data database 107 communicate and share data with one another by way of network 108. Network 108 may include multiple networks, or a network of networks, but is shown in simple form so as not to obscure aspects of the present disclosure. By way of example, network 108 can include one or more wide area networks (WANs), one or more local area networks (LANs), one or more public networks, such as the Internet, and/or one or more private networks. Where network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 108 is not described in significant detail.

The computing device 102 may be any computing device that is capable of performing various functions described herein, such as the computing device 1400 of FIG. 14. Additionally, while only one computing device 102 is illustrated in FIG. 1, multiple computing devices may be utilized to carry out embodiments described herein. Each computing device 102 may be capable of accessing the Internet, such as the World Wide Web. The computing device 102 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the computing device 102 may include one or more processors, and one or more computer-readable media. The computer-readable media may include computer-readable instructions executable by the one or more processors.

For example, each of a plurality of computing devices may be used to carry out various portions of an algorithm to generate a shoppable video, and as such, these computing devices may operate in parallel. In other embodiments, multiple computing devices may each perform the same functions. As further described herein, computing device 102 includes memory and processors to generate shoppable videos, which includes dividing a video into scenes and frames, and creating one or more copy frames of each frame that have different resolutions from one another. The computing device 102 further takes each copy frame and breaks it up into tiles so that for each tile, a feature vector can be computed. The computing device 102 compares feature vectors of each tile to feature vectors computed for a plurality of images stored in a database, such as database 106, to determine the products that appear in the video.

The deep convolutional neural network 104 is a type of feed-forward artificial neural network. Generally, a convolutional neural network is a model with a large learning capacity that can be controlled by varying their depth and breadth. Compared to standard feedforward neural networks, convolutional neural networks have fewer connections and parameters, and as such, may be easier to train. Deep learning is a class of machine learning training algorithms that may use a cascade of many layers of nonlinear processing units for feature extraction and transformation. The next layer uses the output from the previous layer as input, and so on. Deep learning may also be based on learning of multiple levels of features representations, where the layers form a hierarchy from low-level features to high-level features. While described as a deep convolutional neural network, many other network types could be used in various embodiments to generate shoppable videos. A deep convolutional neural network 104 is described for exemplary purposes only, and is not meant to be limiting in any way.

The shoppable video generation engine 110 comprises various components, each of which is responsible for performing a different function or functions. In one embodiment, computing device 102 comprises the shoppable video generation engine 110 and thus performs the functions that will be described with respect to the shoppable video generation engine 110. In other embodiments, another computing device is responsible for performing the functions that will be described with respect to the shoppable video generation engine 110. The shoppable video generation engine 110 comprises a scene parsing component 112, a frame parsing component 114, a copy resolution component 116, a tile parsing component 118, a product image feature vector component 120, a tile feature vector component 122, a feature vector comparing component 124, a product determining component 126, and a shoppable video generation component 128.

The scene parsing component 112 is configured to parse a video into one or more scenes, or typically into two or more scenes. Individual scenes may be identified automatically, such as by computing device 102 of FIG. 1, in many ways. For instance, a video may include various sections, where each of the sections showcases a different set of products. Each of these sections may be identified as a different scene of the video. A first section of the video, for example, may illustrate a man wearing a suit, dress shoes, and sunglasses, while a second section of the video may illustrate a woman wearing a dress holding a bag. The suit, dress shoes, and sunglasses may be identified as being the products showcased in the first scene, while the dress and bag may be identified as products showcased in the second scene.

The frame parsing component 114 is configured to parse the video into individual frames for computation of feature vectors, as will be described in more detail below. Once the video has been parsed into individual frames, the copy resolution component 116 generates copies or variations of each frame in different resolutions. For example, for a first frame, the copy resolution component 116 may generate one or more copy frames, each of the one or more copy frames having a different resolution. In some embodiments, two or more copy frames are generated, each having a different resolution. For instance, a first frame of a video may have two corresponding frames that have resolutions that are lower than the first frame, but are of the same image. These lower resolution frames may also be termed down-sampled versions.

Figure 4:
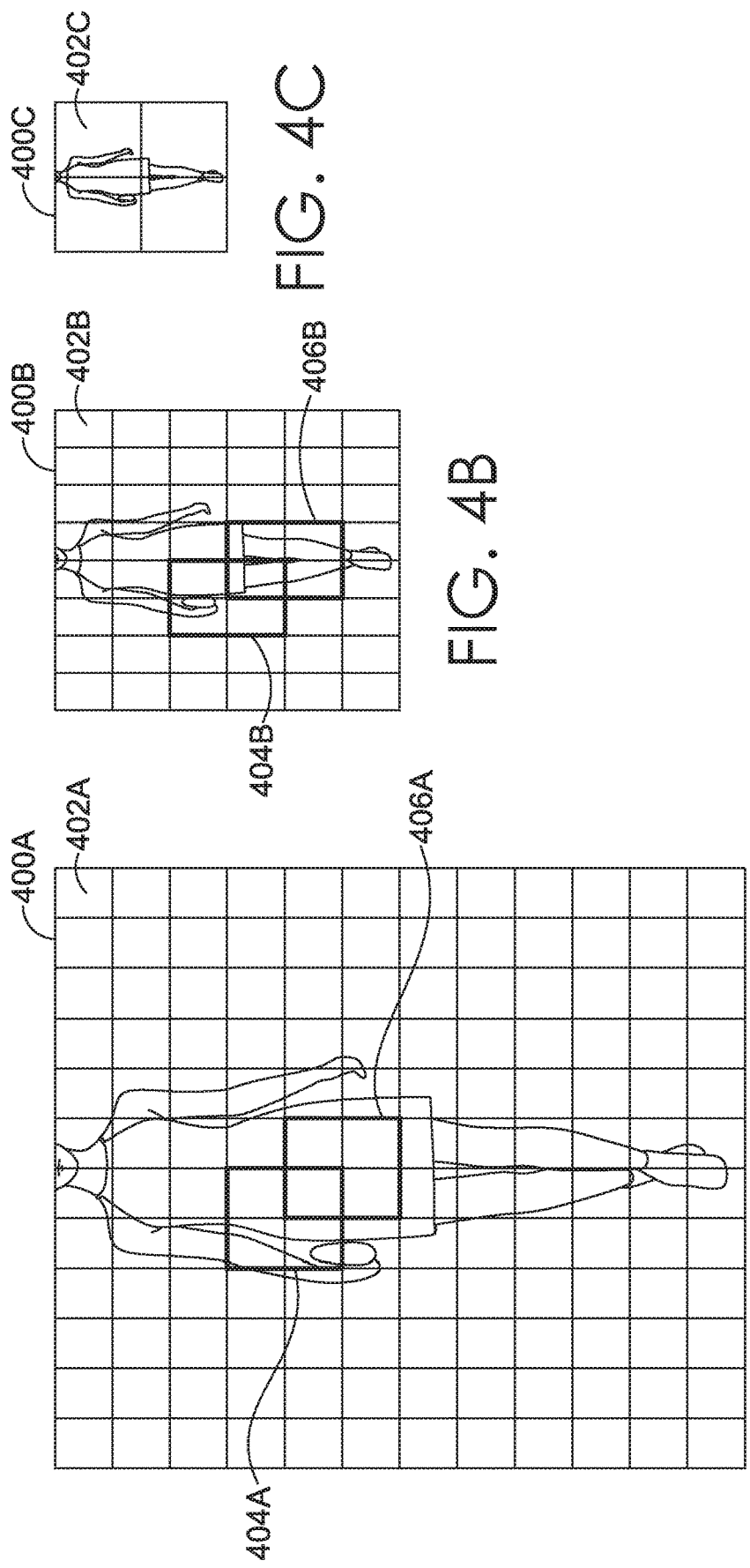
FIGS. 4A, 4B, and 4C depict exemplary frames of a video at different resolutions, in accordance with an embodiment of the present invention.

The tile parsing component 118 cuts or divides each frame and its copy frames (e.g., having different resolutions) into a plurality of tiles. In one embodiment, the tiles are overlapping tiles of fixed size, W×W. An exemplary but non-limiting tile size is 250×250 pixels, but the tiles could be of many different sizes. As such, the tile parsing component 118 divides multiple copy frames of different resolutions (e.g., all of which corresponding to a single frame of a video) into a plurality of tiles. FIGS. 4A, 4B, and 4C illustrate exemplary frames having different resolutions. For instance, FIG. 4A illustrates a frame 400A that has the highest resolution, and thus is divided into the most tiles. For example, tile 402A is an individual tile whose feature vector may be computed, as discussed below. In combination or in addition to individual tiles, such as tile 402A, tiles may overlap with other tiles, such as tiles 404A and 406A. Similarly, in FIG. 4B, copy frame 400B has a resolution lower than frame 400A, and includes individual tile 402B, along with tiles 404B and 406B that are shown as overlapping one another. FIG. 4C illustrates a copy frame 400C having a resolution that is lower than frames 400A and 400B. Copy frame 400C includes several individual tiles, including tile 402C.

Figure 5:
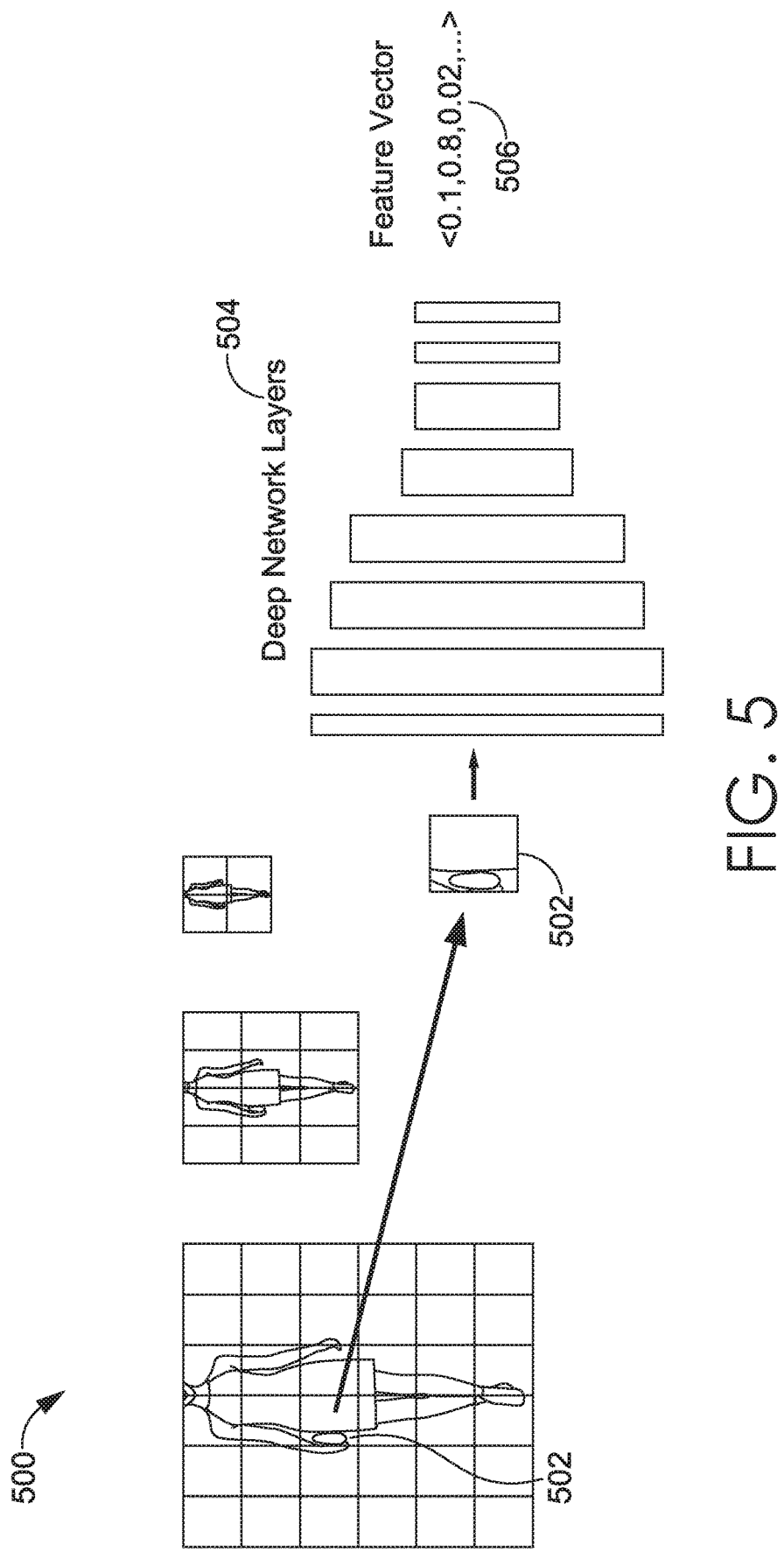
FIG. 5 depicts a computation of a feature vector of a tile of a frame, in accordance with embodiments of the present invention.
Figure 6:
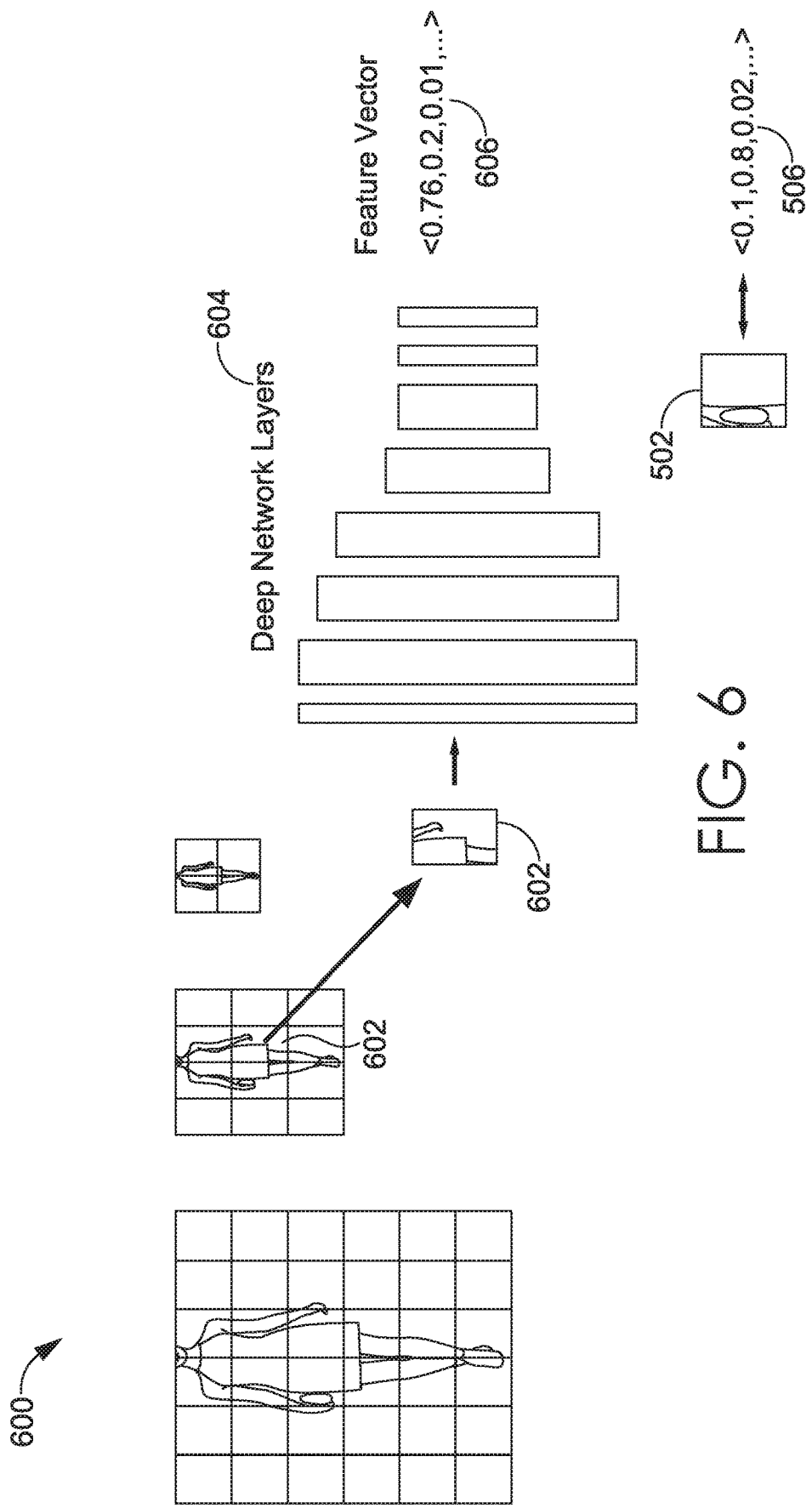
FIG. 6 depicts a computation of a feature vector of a tile of a frame, in accordance with embodiments of the present invention.
Figure 7:
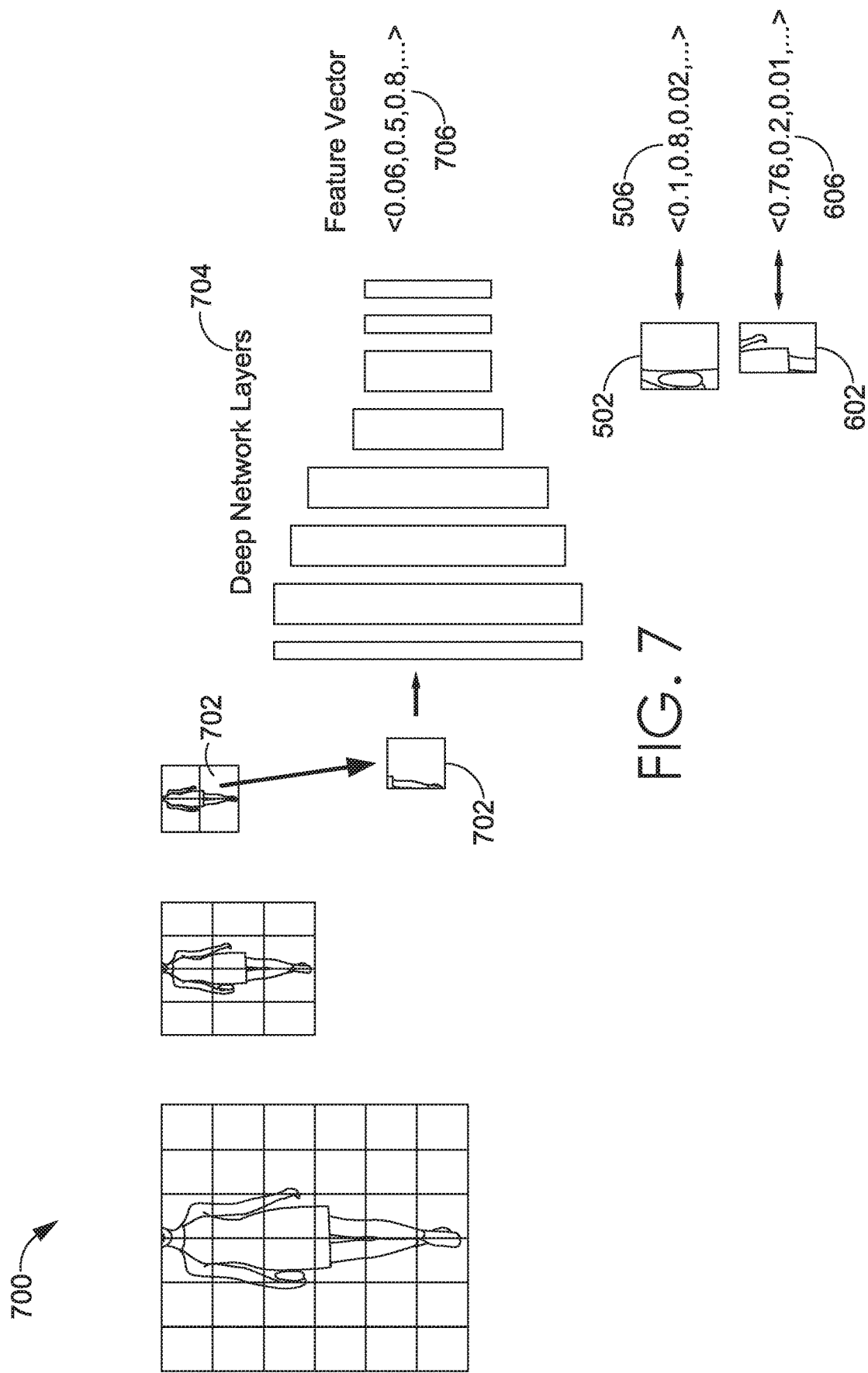
FIG. 7 depicts a computation of a feature vector of a tile of a frame, in accordance with embodiments of the present invention.

The product image feature vector component 120 is configured to compute a feature vector for each product image stored in the product image database 106. For instance, the deep convolutional neural network 104 of FIG. 1 described herein may have been pre-trained on a large class of images. These images and their respective computed feature vectors are stored in the product image database 106. These feature vectors may be pre-computed, or may be computed in real-time. The tile feature vector component 122 is configured to compute a feature vector for each tile. FIGS. 5, 6, and 7 depict a computation of a feature vector of a tile of a frame, in accordance with embodiments of the present invention. Represented generally by numerals 500, 600, and 700, respectively, FIGS. 5, 6, and 7 illustrate that each tile is processed through deep network layers to compute a feature vector. For instance, in FIG. 5, tile 502 is illustrated as being processed through deep network layers 504 in order to determine that tile's feature vector 506. As shown, a feature vector is a set of numerals, each of which represents a feature of the image. For instance, an image having a feature vector of <0.1, 0.8, 0.02, 0.43, 0.97> may provide information regarding one or more objects in the image, such as color components, length, area, shape description, gradient magnitude, or gradient direction. Other features of an image may also be represented by a computed feature vector, and are contemplated to be within the scope of aspects herein.

Similarly, FIG. 6 illustrates a tile 602 of a frame copy (e.g., having a lower resolution than the image having tile 502 in FIG. 5) being processed by deep network layers 604 to compute a feature vector 606. The feature vector 506 for tile 502 of FIG. 5 is illustrated as well in FIG. 6. FIG. 7 illustrates a tile 702 of a frame copy (e.g., having a lower resolution than the image having tile 502 in FIG. 5 and the image having tile 602 of FIG. 6) being processed by deep network layers 704 to compute a feature vector 706. Tiles 502 and 602 are illustrated in FIG. 7, along with their respective feature vectors, 506 and 606. While in FIGS. 5, 6, and 7 the deep network layers are labeled as items 504, 604, and 704, it is contemplated that the deep network layers utilize the same neural network, such as a deep convolutional neural network. For instance, tiles 502, 602, and 702 may actually be processed through the same deep network layers for computing their individual feature vector.

Returning to FIG. 1, the feature vector comparing component 124 is configured to compare the computed feature vector for each tile with the feature vector of a plurality of product images stored in the product image database 106. As previously described, a large set of product images may be stored in the product image database 106. A feature vector is computed for each product image so that it can be compared to the computed feature vectors of the individual tiles in order to determine which product(s) appears in a given frame, a given scene, a given video, and the like. In one embodiment, once the feature vector comparisons have been made, the system may identify those images that are the top matching images. For instance, the system may choose the top five closest matching product images by comparing the distance between the tile's feature vector and the feature vectors of the various product images. In some embodiments, the feature vector comparisons are used to compute a product score for each product, or at least a portion of the products having product images in the database. The product score is then used to determine the products that have the highest likelihood of appearing in the frame.

The product determining component 126 is configured to determine which products are visible in the individual frames, scenes, videos, etc. As mentioned above, the system may identify those product images that are the top matching images based on the distance between feature vectors of tiles and product images. The top matches may be identified as being included in a particular frame, and thus in a particular scene and video. The product determining component 126 may utilize a product scoring mechanism to monitor a quantity of times the system (e.g., running an algorithm) indicates that a particular product is visible in a frame. For instance, each product may be associated with multiple product images that are stored in the product image database 106. These may be spinset views of a single product, such as photos taken from a different angle, different resolutions of the same image, etc. As such, multiple product images of the same product may have feature vectors that are the closest matches to the feature vector of a particular tile.

As mentioned, the product determining component 126 may be configured to assign or compute a product score to various products having product images stored in the product image database 106. Using the above scenario, the product score for the product may be increased or incremented based on there being multiple product images of the same product that are the closest matches. This may be a good indicator that the product is visible in the frame. In one embodiment, the initial product score is based, at least, on the difference in distance between two feature vectors being compared. If there is more than one product image associated with the same product, the product score for that product may take into account the differences in distance between the feature vectors of all product images associated with that product and the feature vector of the tile.

When the product determining component 126 determines that the number of frames of a scene or video in which a particular product is present is less than a predetermined threshold of frames, the system may remove the product from the shoppable video as being erroneous, such as a product that was not intended to be featured in the video. This may enhance the precision of the products featured in the shoppable video, and also the usability of the shoppable video to a consumer. Additionally, the product determining component 126 may output or identify only those products whose product score exceeds a predetermined threshold. As mentioned, a product score may initially be determined by an algorithm that utilized a neural network, such as a deep convolutional neural network having a plurality of nodes. As an image, such as a tile, is processed through the neural network, the product determining component 126 may keep track of the product score and accumulate the scores or votes that each product gets. Additionally, a product's product score for a particular tile may be increased or decreased based on many factors, such as a quantity of product images associated with the same product that are found to be the closest matches to a tile, based on a comparison of the feature vectors.

Figure 8:
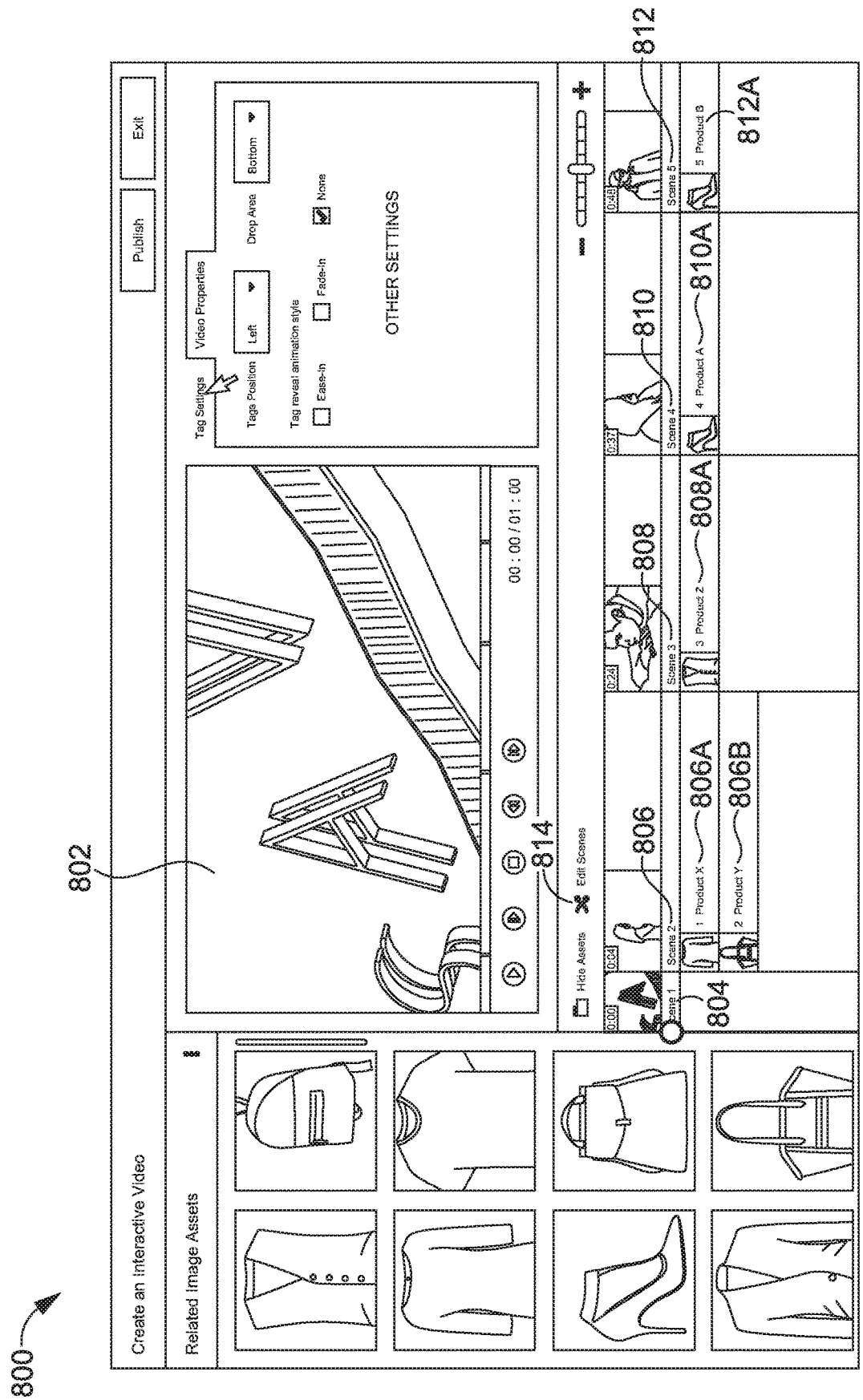
FIG. 8 depicts an exemplary user interface for automatically extracting scenes from a video, in accordance with embodiments of the present invention.

The shoppable video generation component 128 is configured to generate a shoppable video based on the products determined to be included in the corresponding video. FIGS. 8-12 illustrate how a shoppable video is generated, and thus will be discussed here. For instance, FIG. 8 depicts an exemplary user interface 800 for automatically extracting scenes from a video, in accordance with embodiments of the present invention. As mentioned, a video may be broken up into two or more scenes. Here, the scenes have been automatically determined to include scene 1 804, scene 2 806, scene 3 808, scene 4 810, and scene 5 812. The image on the video screen 802 is the same image illustrated in scene 1 804, and as such, the video screen 802 is currently showing an image from scene 1 804. The scenes may be manually edited using the "edit scenes" button 814. FIG. 8 also illustrates that some products have been automatically associated with various scenes. For instance, FIG. 8 shows that product X 806A and product Y 806B are included in scene 2 806, and are thus now associated with scene 2 806. These products may have been automatically identified using an algorithm, such as the one described herein where feature vectors computed for tiles are compared to feature vectors computed for a plurality of product images stored in the product image database 106 of FIG. 1. Similarly, product Z 808A was automatically found to be included in scene 3 808, product A 810A was found to be included in scene 4 810, and product B 812A was found to be included in scene 5 812.

Figure 9:
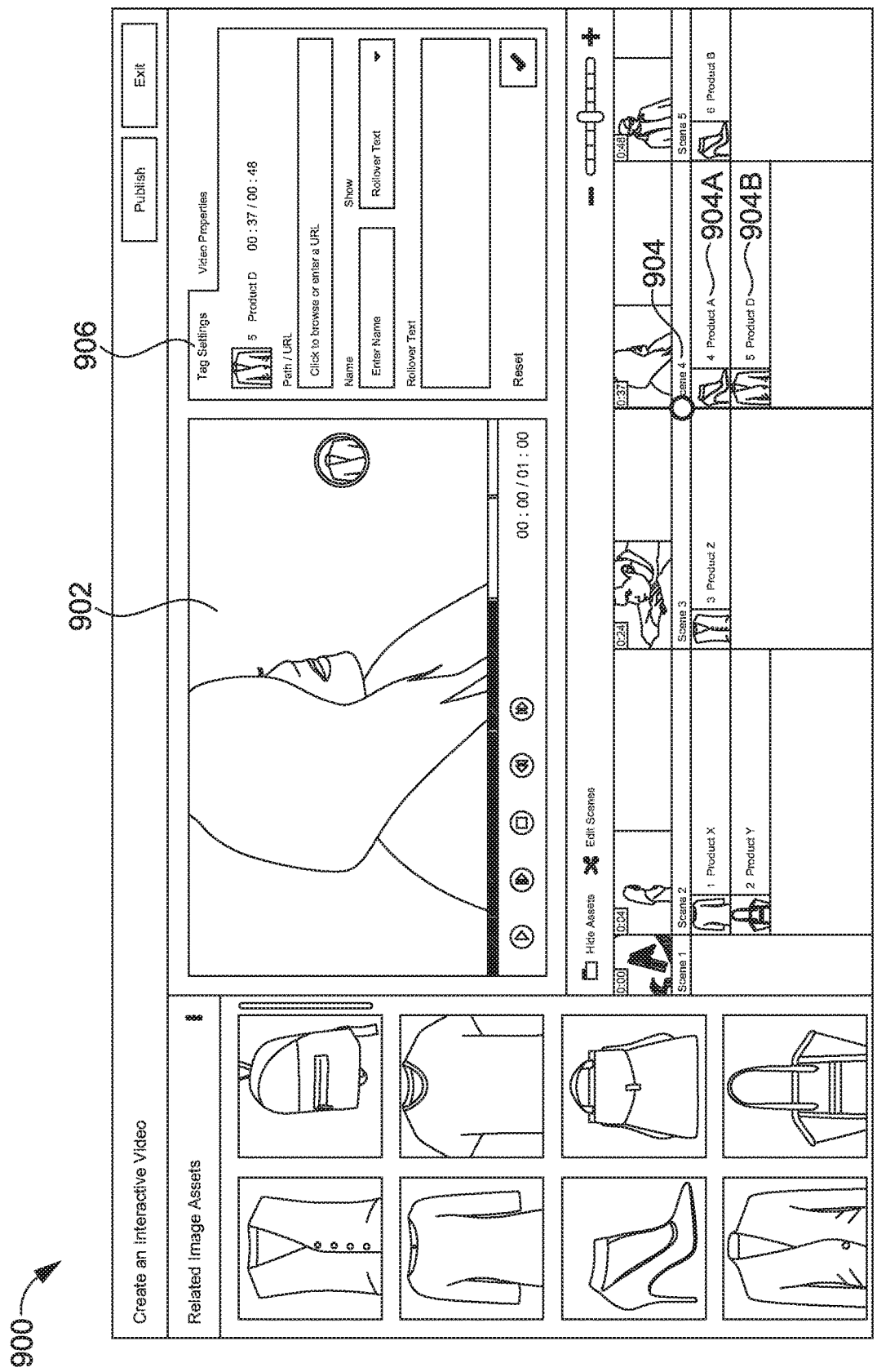
FIG. 9 depicts an exemplary user interface for automatically associating products and product data with scenes from a video, in accordance with embodiments of the present invention.
Figure 10:
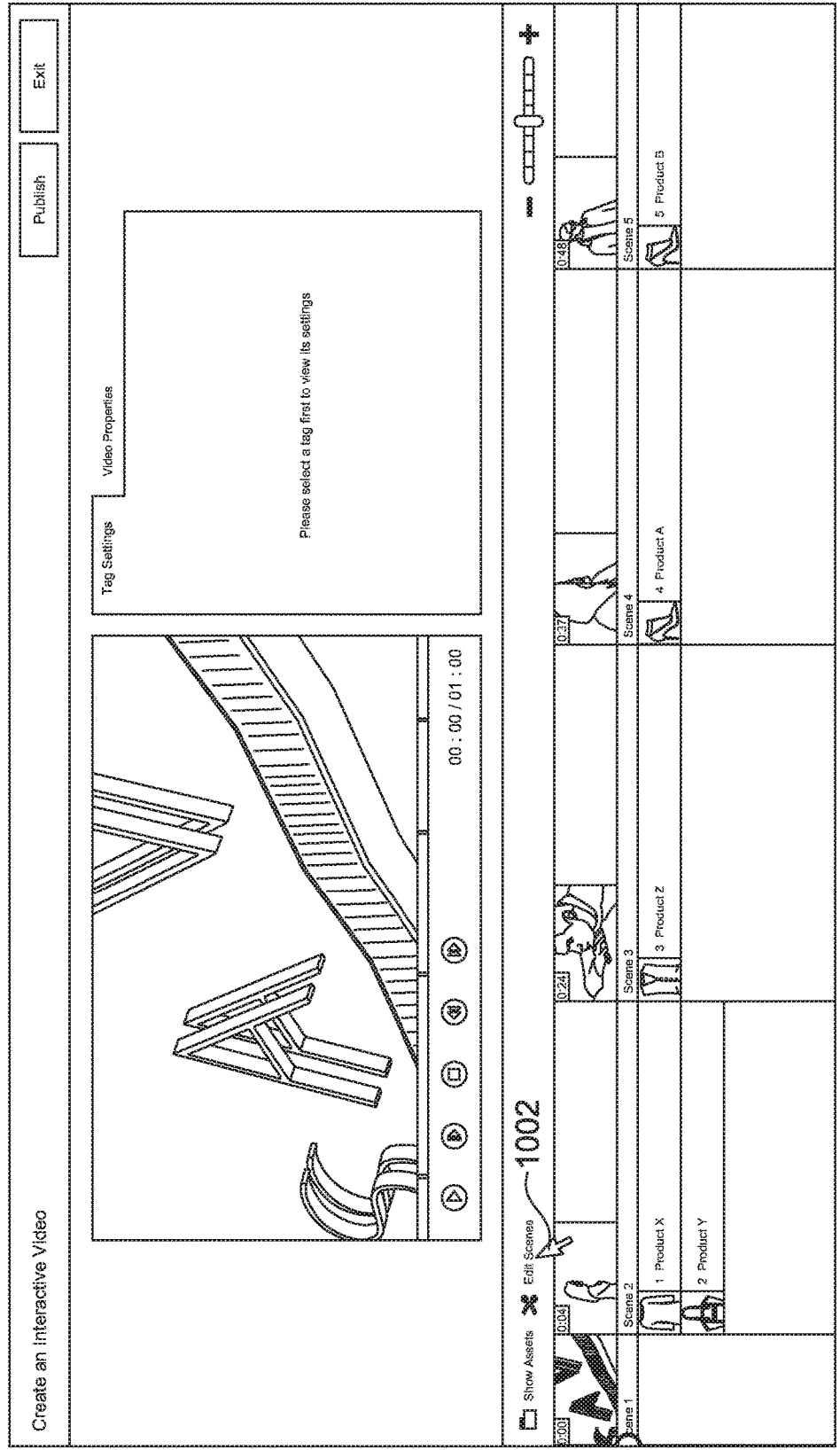
FIG. 10 depicts an exemplary user interface for adjusting scenes of a video, in accordance with embodiments of the present invention.
Figure 11:
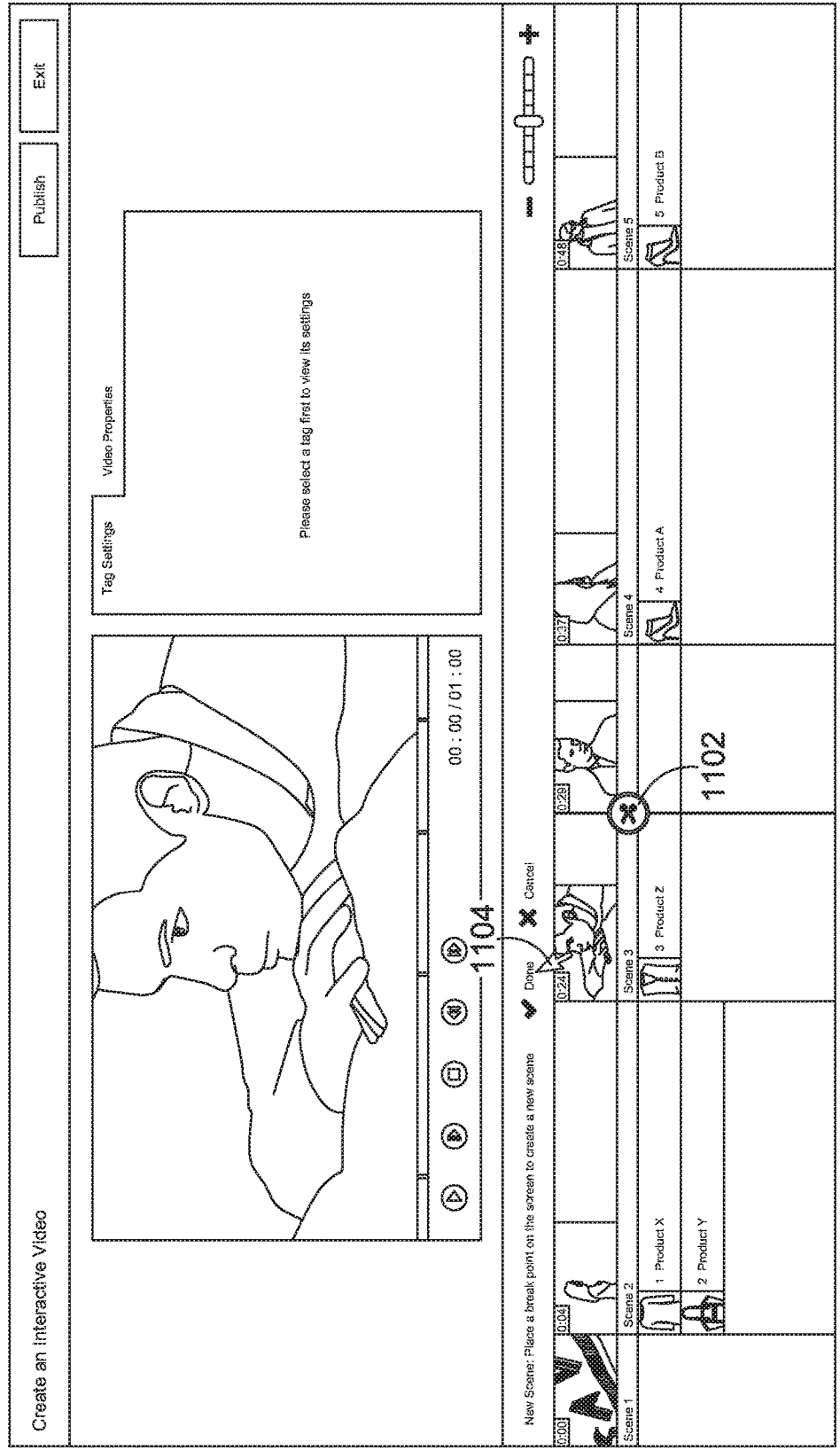
FIG. 11 depicts another exemplary user interface for adjusting scenes of a video, in accordance with embodiments of the present invention.

FIG. 9 depicts an exemplary user interface 900 for automatically associating products and product data with scenes from a video, in accordance with embodiments of the present invention. Further to the products illustrated in FIG. 8 that had been automatically identified as being included in the various scenes of the video, FIG. 9 illustrates that both product A 904A and product B 904B have been identified as being included in scene 4 904. The image on the video screen 902 illustrates that it is currently playing scene 4 904. FIG. 10 depicts an exemplary user interface 1000 for adjusting scenes of a video, in accordance with embodiments of the present invention. The "edit scenes" button 1002 is illustrated in FIG. 10, and allows a user, for instance, to manually edit where a particular scene begins and ends, when needed. FIG. 11 depicts another exemplary user interface 1100 for adjusting scenes of a video, in accordance with embodiments of the present invention. Here, a user may be allowed to place a break point on the scene to create a new scene, or to adjust where a scene begins and ends, such as by using the edit icon 1102. Once adjustments are made, the user may select the "done" button 1104.

Figure 12:
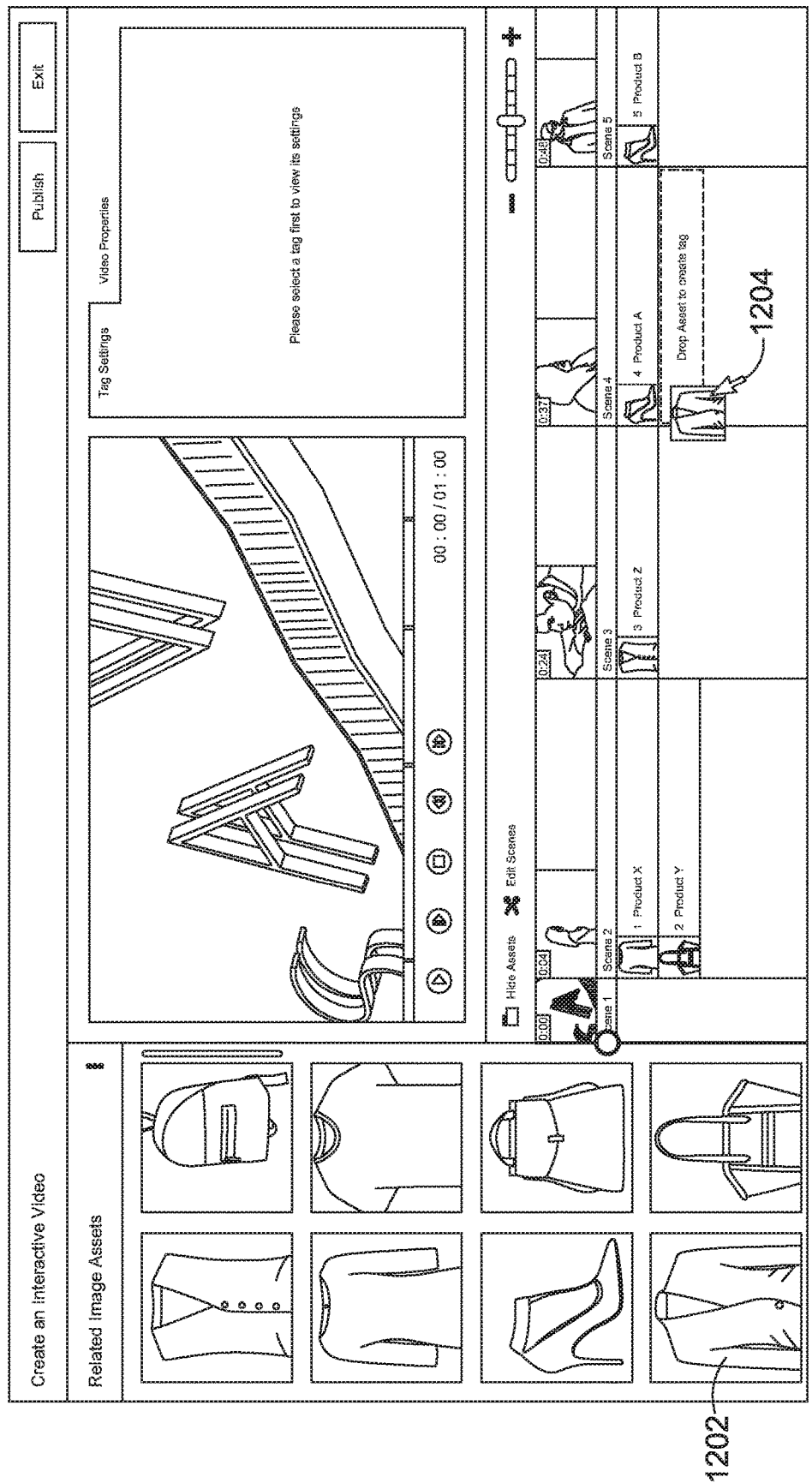
FIG. 12 depicts an exemplary user interface for manually adjusting the association between a product and a scene of a video, in accordance with embodiments of the present invention.

FIG. 12 depicts an exemplary user interface 1200 for manually adjusting the association between a product and a scene of a video, in accordance with embodiments of the present invention. Once products have been automatically identified and associated with various scenes of a video, a user may determine that a product not identified should be associated with a particular scene. Here, a jacket was not associated with scene 4, but the user believes it should have been. The user may select the jacket icon 1202 and move it underneath scene 4, illustrated by cursor 1204, to associate the jacket with scene 4.

Figure 13:
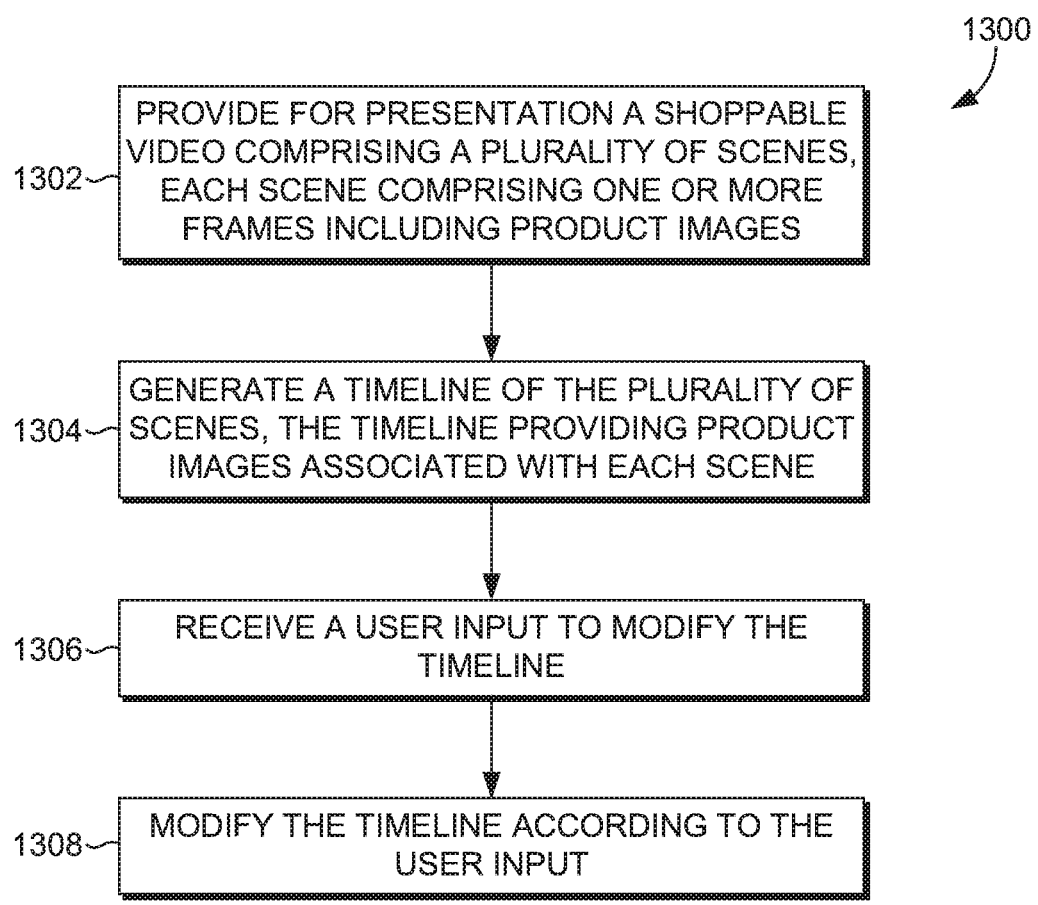
FIG. 13 depicts a flow diagram showing a method for generating a user interface for displaying a shoppable video, in accordance with embodiments of the present invention.

Turning now to FIG. 13, a flowchart is illustrated of a method 1300 for generating a user interface of a shoppable video, in accordance with an embodiment herein. The user interaction provided with the user interface described herein allows a user to customize an automatically generated shoppable video, such as manually adding products to the shoppable video, removing products from a shoppable video, modifying the location of a products from one scene to another scene of the shoppable video, modifying scene start and end times, etc. At block 1302, a shoppable video is provided for presentation. The shoppable video may comprise a plurality of scenes where each scene comprises frames that include product images. A timeline is generated at block 1304, where the timeline illustrates the video by scene and provides product images associated with each scene. This has been described herein with respect to the screenshot of FIG. 9, for example. At block 1306, a user input is received to modify the timeline. The modification indicated by the user input may be to disassociate a product that had been automatically associated with a particular scene, to associate a product with a scene that had not been previously automatically associated, to move the start time or end time of a particular scene either forward or behind of the current start/end time, etc. This allows the user to interact with the user interface of the shoppable video to provide input, when desired. At block 1308, the timeline is modified according to the user input.

Returning again to FIG. 1, the shoppable video generation component 128 not only generates the shoppable video, but may also retrieve product data associated with each associated product so that when a consumer is viewing the shoppable video, the consumer can easily view details associated with the product, such as price, where the product is sold, materials of the product, size options, product name, color options, availability, etc. In one embodiment, this product data may be retrieved from a product data database 107 by the shoppable video generation component 128 or other component that is configured to retrieve the product data.

Figure 2:
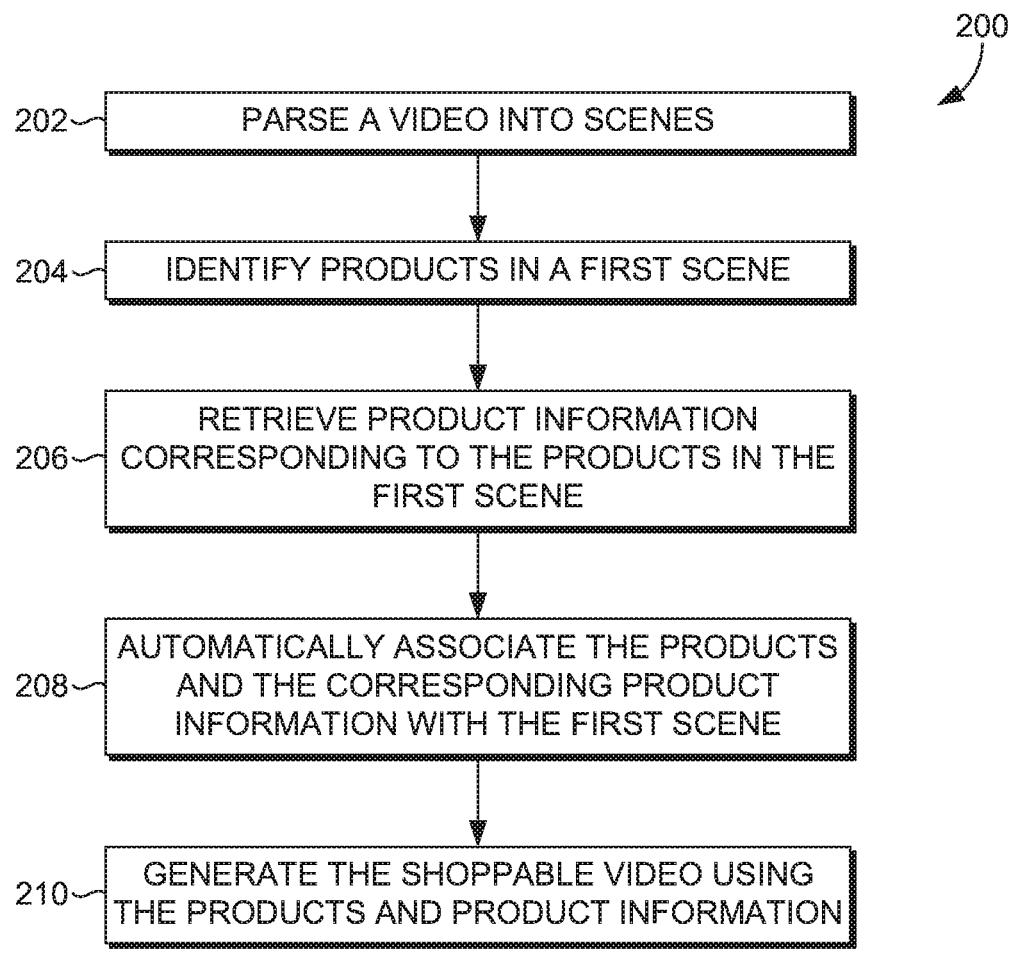
FIG. 2 is a flow diagram showing a method for generating a shoppable video, in accordance with an embodiment of the present invention.

Turning now to FIG. 2, a flow diagram is illustrated showing a method 200 for generating a shoppable video, in accordance with an embodiment of the present invention. At block 202, a video is parsed into scenes. Products in a first scene are identified at block 204. This identification of products could be done in many ways. For instance, this identification could be based on a plurality of features identified in the video frames of the first scene compared to a plurality of features identified in a plurality of product images stored in a database. This could be done by a comparison of feature vectors, for instance, as further described herein. At block 206, product information corresponding to the identified products in the first scene are retrieved, such as from a database. The products and corresponding product information are automatically associated with the first scene of the video, shown at block 208. At block 210, a shoppable video is generated, where the shoppable video is generated using the associated products and corresponding product information. The shoppable video may include products identified from a variety of scenes, in addition to the first scene of the video.

In various embodiments, a video is provided. The video is used to generate a shoppable video, and as such, the video includes product images in the various frames of the video. The video is parsed into frames. The quantity of frames may depend on the length of the video. For a first frame, one or more copy frames having different resolutions are produced. The first frame may have a first resolution, for example, and one or more copy frames may be produced having different resolutions than the first frame. In some embodiments, these copy frames have resolutions that are lower than the resolution of the first frame. The first frame and the copy frames are partitioned into a plurality of tiles. As mentioned, a tile is a small portion of a frame of a fixed size. FIGS. 4A, 4B, and 4C illustrate frames having been partitioned into tiles. In some instances, the tiles overlap one another.

For each tile that has been partitioned from the first frame and copy frames, a feature vector is computed. A feature vector is an n-dimensional vector of numerical features that represent an object. In embodiments, the feature vector of a tile may numerically represent one or more of color components, length, area, shape description, gradient magnitude, gradient direction, etc. In some embodiments, the feature vectors are computed using a deep convolutional neural network that has been pre-trained to recognize various objects. Values of the feature vector are compared to values of feature vectors of product images stored in the database. Product scores are then computed for products having corresponding product images stored in the database. In one instance, product scores are only generated for products having a corresponding product image that has been found to be visible is one or more frames of the video. As mentioned, a product may be represented by one or more product images in the database. These product images may depict different views of the product, may be of different resolutions from one another, etc.

Products that are in the first frame may be determined, such as based on the computed product scores. Additionally, this determination of products in the first frame may include monitoring votes received for the products, which is based on the feature vectors of product images associated with those products. For instance, a first product having a higher vote count than a second product may indicate an increased likelihood that the first product is visible in the video, when compared to the second product. The shoppable video may then be generated. The shoppable video is generated, at least partly, by retrieving shopping data for the products determined to be in the video. The shopping data may include, for example, price, where the product is sold, materials of the product, size options, product name, color options, availability, etc. Further, in embodiments, the video is divided into scenes, based on the content of the video frames. The shoppable video may be displayed in scenes, so that a consumer can view products and product information for each scene.

Similarly, the above process would be performed on subsequent frames. For example, for a second frame, one or more copy frames of different resolutions than the second frame are produced. The second frame and the copy frames are partitioned into a plurality of tiles. For each tile, a feature vector is computed. Values of the feature vector and values of the feature vectors of the product images stored in the database are compared. Based on the comparison, a product score is computed for the products having corresponding product images stored in the database. It can then be determined which products are in the second frame based on the computed product scores.

Figure 3:
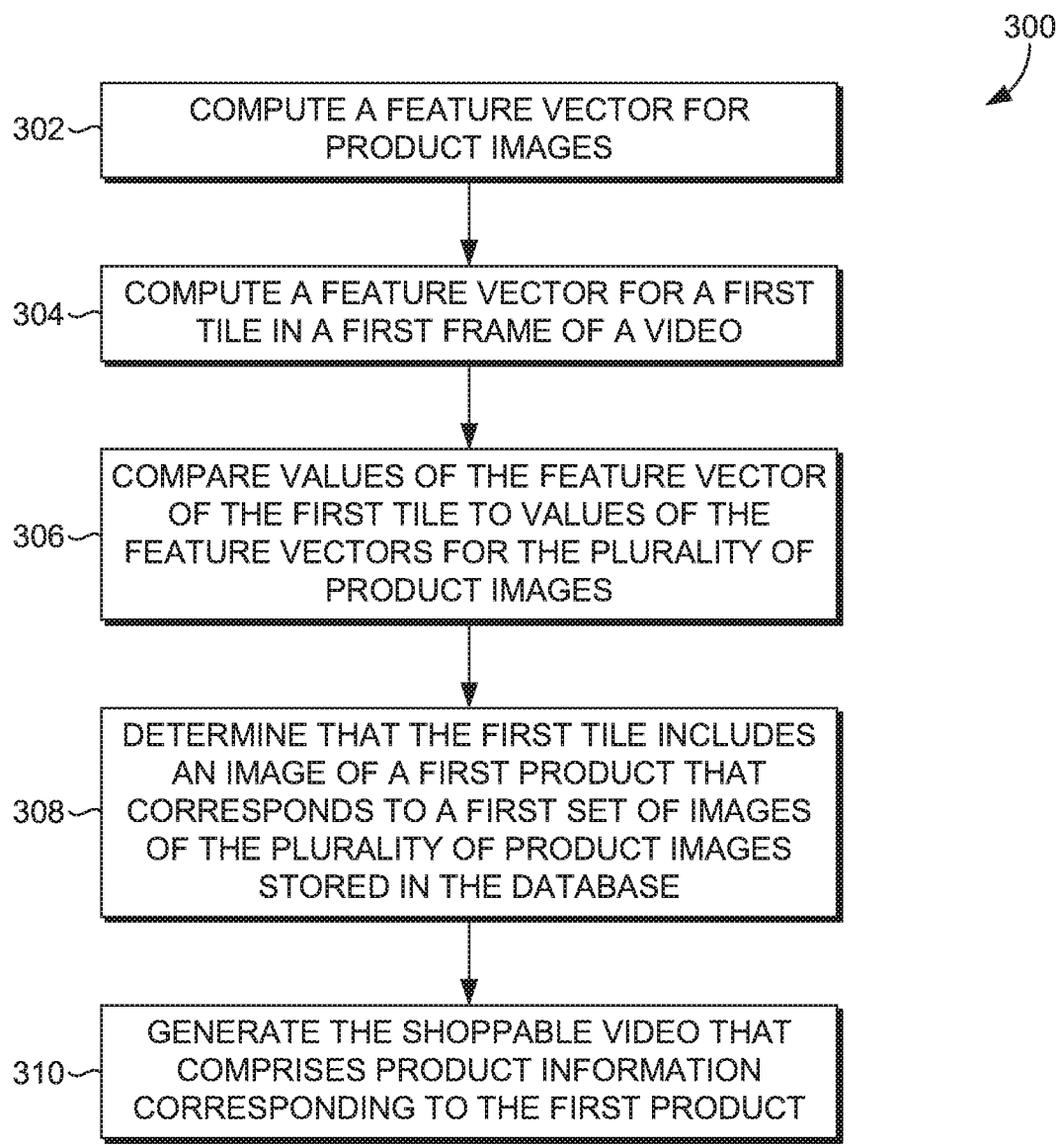
FIG. 3 is another flow diagram showing a method for generating a shoppable video, in accordance with embodiments of the present invention.

FIG. 3 is another flow diagram showing a method 300 for generating a shoppable video, in accordance with embodiments of the present invention. Initially, at block 302, a feature vector is computed for product images that are stored in a database. At block 304, a feature vector is computed for a first tile in a first frame of a video. For instance, a given video may have been divided into frames, where each frame is then subdivided into a plurality of tiles. At block 306, values of the feature vector of the first tile are compared to values of the feature vectors of the product images computed at block 302. At block 308, it is determined that the first tile includes an image of a first product that corresponds to a first set of images stored in the database. As mentioned, each product may have an associated set of product images stored in the database, such as product image database 106 of FIG. 1. These images in the set may include different views of an image, different resolution images, etc. This determining step of block 308 may comprise monitoring votes received for the first product, where the votes are determined by the algorithm that compares feature vectors of tiles to feature vectors of product images. For example, if a first product image and a second product image corresponding to the same product both have feature vectors that are close in distance to a feature vector of a first tile, there would be an increased chance that the product is visible in the first tile. This may be a "vote" or "score" that is used to represent the likelihood that the product is visible in the frame. A first product having a higher vote count than a second product may result in the first product having a higher product score, thus indicating an increased likelihood that the first product is visible in the video.

At block 310, the shoppable video is generated, where the shoppable video comprises product information corresponding to the first product. This product information, also termed shopping data, may be retrieved from the product data database 107 of FIG. 1. Prior to the shoppable video being generated, the steps described above may be repeated for each frame of the video, and for each tile in those frames. The shoppable video would then accurately reflect the products and product information included in the entire video, or at least those whose product scores exceed a minimum threshold. As mentioned above with respect to FIG. 2, the video may be divided into a plurality of scenes based on the content of the video. The shoppable video may include a presentation of products found in the video based on a scene in which each product is found.

Having described an overview of embodiments of the present invention, an exemplary operating environment in which embodiments of the present invention may be implemented is described below in order to provide a general context for various aspects of the present invention. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

Embodiments herein may be described in the general context of computer code or machine-useable instructions, including computer-executable instructions such as program modules, being executed by a computer or other machine, such as a personal data assistant or other handheld device. Generally, program modules including routines, programs, objects, components, layout structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes a bus 1410 that directly or indirectly couples the following devices: memory 1412, one or more processors 1414, one or more presentation components 1416, input/output (I/O) ports 1418, input/output (I/O) components 1420, and an illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 14 is merely illustrative of an exemplary computing device that can be used in connection with one or more embodiments of the present invention. Distinction is not made between such categories as "workstation," "server," "laptop," "handheld device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, layout structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, layout structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors 1414 that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be equipped with depth cameras, such as stereoscopic camera systems, infrared camera systems, RGB camera systems, touchscreen technology, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

As can be understood, embodiments of the present invention enable the generation of shoppable videos by automatically identifying products in a video and retrieving product information for the identified products. This allows for a consumer to efficiently view a video and have the option to purchase an item shown in the video without the need to perform a search for that product, search for product information, etc. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to generate a shoppable video, comprising:

identifying, by a product determining module, one or more products in a first video scene of a video, the identifying comprising comparing a feature vector generated from a tile in a frame from the first video scene with feature vectors of product images;

retrieving, by a video generation module, product information corresponding to the one or more products in the first video scene based on the identified one or more products;

associating, by the video generation module, the one or more products and the corresponding product information with the first video scene; and generating the shoppable video using the associated one or more products and the corresponding product information.

2. The one or more computer storage media of claim 1, wherein the identifying of the one or more products in the first video scene further comprises comparing a plurality of features associated with the frame of the first video scene to a plurality of features for the product images.

3. The one or more computer storage media of claim 1, wherein associating the one or more products and the corresponding product information with the first video scene further comprises:

for the frame from the first video scene, producing one or more copy frames having different resolutions; and partitioning the frame and the one or more copy frames into a plurality of tiles.

4. The one or more computer storage media of claim 3, wherein at least a portion of the plurality of tiles overlap with another tile.

5. The one or more computer storage media of claim 3, further comprising:
for each of the plurality of tiles in the frame and the one or more copy frames,
(1) computing a feature vector,
(2) comparing values of the feature vector corresponding to each of the plurality of tiles to values of feature vectors of the product images, and
(3) based on the comparison, computing a product score for a plurality of products having corresponding product image.

6. The one or more computer storage media of claim 5, further comprising based at least on the computed product score, determining the one or more products to associate with the first video scene.

7. The one or more computer storage media of claim 5, further comprising:
for a second frame from the first video scene, producing one or more copy frames having different resolutions than the second frame;
partitioning the second frame and the one or more copy frames into a plurality of tiles; and
for each of the plurality of tiles in the second frame and the one or more copy frames,
(1) computing a feature vector,
(2) comparing values of the feature vector corresponding to each of the plurality of tiles to values of the feature vectors of the product images, and
(3) based on the comparison, computing the product score for a plurality of products having corresponding product images.

8. The one or more computer storage media of claim 1, wherein the feature vector generated from the tile in the frame is an n-dimensional vector of numerical features that represent an object.

9. The one or more computer storage media of claim 8, wherein the feature vector numerically represents one or more of color components, length, area, shape description, gradient magnitude, or gradient direction of the object.

10. The one or more computer storage media of claim 1, wherein the identifying comprises computing a product score for a plurality of products having corresponding product images.

11. The one or more computer storage media of claim 1, further comprising:
determining the one or more products to associate with the first video scene based, at least, on computed product scores for a plurality of products having corresponding product images.

12. The one or more computer storage media of claim 11, wherein the computed product scores are based on, at least, monitoring votes received for the plurality of products, such that a first product having a higher vote count than a second product indicates an increased likelihood that the first product is visible in the video.

13. The one or more computer storage media of claim 1, wherein the shoppable video presents the one or more products based on a scene in which each product is found.

14. A computerized method for generating a shoppable video, the computerized method comprising:
computing, by an image feature vector module, a feature vector for each of a plurality of product images stored in a database;
automatically identifying, by a product determining module, one or more products in a first video scene of a video, the identifying comprising:
computing, by a tile feature vector module, a feature vector for a first tile of a first frame of the first video scene;
comparing, by the product determining module, values of the feature vector of the first tile to values of the feature vectors for the plurality of product images; and
based on the comparing, determining that the first tile includes an image of a first product that corresponds to a first set of images of the plurality of product images stored in the database indicating a likelihood that a first product is visible in the first video scene; and
generating the shoppable video based on the automatically identified one or more products, the shoppable video comprising product information corresponding to the first product.

15. The computerized method of claim 14, further comprising:
computing a feature vector for a second tile in a first frame of a video;
comparing values of the feature vector of the second tile to values of the feature vectors for the plurality of product images;
based on the comparing, determining that the second tile includes an image of a second product that corresponds to a second set of images of the plurality of product images stored in the database; and
generating the shoppable video that comprises the product information corresponding to the first product and the second product.

16. The computerized method of claim 14, further comprising grouping the plurality of frames into one or more video scenes, wherein the shoppable video includes a presentation of the first product and one or more other products found in the video based on a video scene in which each product is found.

17. The computerized method of claim 14, wherein determining that the first tile includes an image of a first product that corresponds to a first set of images of the plurality of product images stored in the database further comprises monitoring votes received for the first product, and wherein the first product having a higher vote count than a second product indicates an increased likelihood that the first product is visible in the video.

18. A computerized system comprising:
a datastore storing product images and associated feature vectors computed for the product images;
one or more processors; and
one or more computer storage media storing computer-useable instructions that, when used by the one or more processors, cause the one or more processors to:
divide, by a scene parsing module, a video into one or more video scenes, each comprising a plurality of frames,
for each of the plurality of frames, generate one or more copy frames using a copy resolution component such that the one or more copy frames have a different resolution,
partition, by a tile parsing module, each of the plurality of frames and each of the one or more copy frames into a plurality of tiles,
for each of the plurality of tiles, compute, by a tile feature vector module, a feature vector,
compare values of the feature vector via a feature vector comparing module, for each of the plurality of tiles to values of the feature vectors computed for the product images stored in the database, for a first video scene, use the comparison of the values of the feature vectors to automatically determine which products are visible in each of the plurality of frames, wherein the comparison includes determining a likelihood that a product is visible in a frame; and generate a shoppable video comprising at least the first video scene having product information corresponding to the one or more product images.

19. The system of claim 18, wherein shoppable video is generated using the products that are determined to be visible in each of the plurality of frames.

20. The system of claim 19, further comprising grouping the plurality of frames into one or more video scenes, wherein the shoppable video includes a presentation of the products that are determined to be visible in each of the plurality of frames based on a video scene in which each product is found.

* * * * *

UNITED STATES PATENT AND TRADEMARK OFFICE
CERTIFICATE OF CORRECTION

PATENT NO. : 10,810,633 B2
APPLICATION NO. : 16/429720
DATED : October 20, 2020
INVENTOR(S) : Vikas Yadav et al.

Page 1 of 1

It is certified that error appears in the above-identified patent and that said Letters Patent is hereby corrected as shown below:

In the Claims

In Column 15, Line 11, Claim 5, delete "image." and insert -- images. --, therefor.

Signed and Sealed this
First Day of December, 2020

Andrei Iancu
*Director of the United States Patent and Trademark Office*